United States Patent [19]

Petersen-Hoj

[11] 4,370,293
[45] Jan. 25, 1983

[54] METHOD FOR THE MANUFACTURE OF BIAXIALLY ORIENTATION-STRETCHED PLASTIC FILM

[75] Inventor: Peter Petersen-Høj, Espergärde, Denmark

[73] Assignee: Tetra Pak Developpement SA, Pully-Lausanne, Switzerland

[21] Appl. No.: 172,704

[22] Filed: Jul. 25, 1980

[30] Foreign Application Priority Data

Jul. 26, 1979 [CH] Switzerland ............... 6935/79

[51] Int. Cl.³ ............................................. B29C 17/04
[52] U.S. Cl. ................................ 264/514; 264/567; 264/568
[58] Field of Search ............ 264/102, 290.2, 40.3, 264/567, 565; 425/66, 326.1; 428/220, 480

[56] References Cited

U.S. PATENT DOCUMENTS

| | | | |
|---|---|---|---|
| 3,257,489 | 6/1966 | Haffelfinger | 264/567 |
| 3,260,776 | 7/1966 | Lindstrom et al. | 264/290.2 |
| 3,337,665 | 8/1967 | Underwood et al. | 425/326.1 |
| 3,456,044 | 7/1969 | Pahlke | 425/326.1 |
| 3,466,356 | 9/1969 | Carlson et al. | 425/66 |
| 3,555,603 | 1/1971 | Haley | 425/326.1 |
| 3,661,482 | 5/1972 | Brown | 425/66 |
| 3,754,063 | 8/1973 | Schirmer | 264/102 |
| 3,871,947 | 3/1975 | Brekken | 428/220 |
| 3,950,466 | 4/1976 | Hasler | 264/567 |
| 3,952,125 | 4/1976 | Karatsuji et al. | 428/220 |

FOREIGN PATENT DOCUMENTS

| | | | |
|---|---|---|---|
| 1422037 | 12/1965 | France | 264/567 |
| 53-45353 | 12/1978 | Japan | 264/171 |

Primary Examiner—Jay H. Woo

[57] ABSTRACT

The present invention relates to a method and apparatus for the manufacture of oriented plastic film, in particular polyester film, by the inflation in two steps of an extruded seamless tube of plastic material. The present invention also relates to the laminate manufactured in accordance with the method.

8 Claims, 2 Drawing Figures

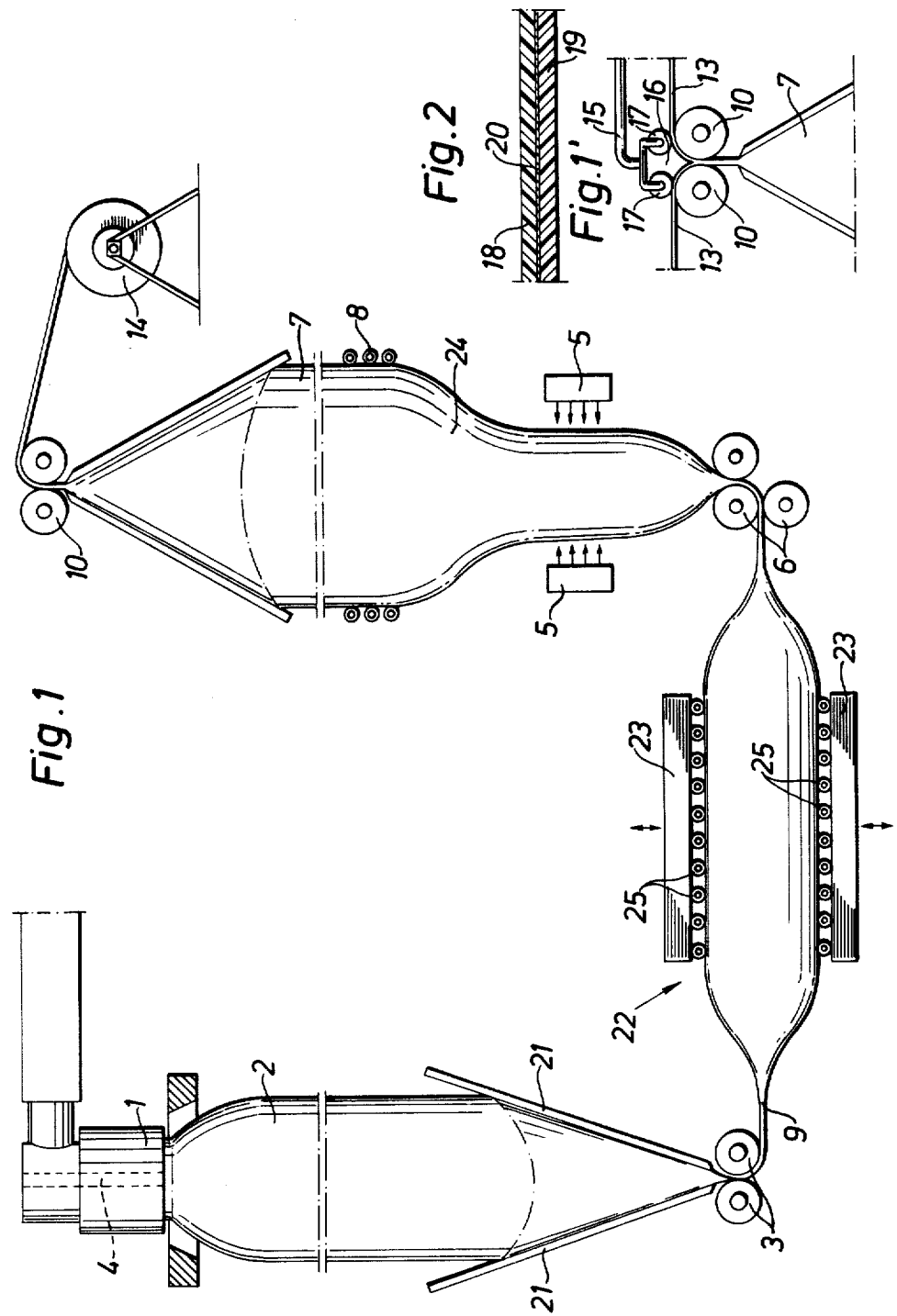

METHOD FOR THE MANUFACTURE OF BIAXIALLY ORIENTATION-STRETCHED PLASTIC FILM

The present invention relates to a method and apparatus for the manufacture of biaxially orientation-stretched plastic film, in particular plastic film consisting of or comprising layers of polyester.

It is known that the tensile strength of many plastic materials, and in particular of polyester, can be greatly improved when the material is subjected to a molecular-orienting stretching. In this molecular-orientation the molecular structure of the plastic material is altered in such a manner, that the material, having been amorphous, becomes crystalline. This stretched material in general has a strong tendency to shrink in a subsequent heating to approximately the dimensions the plastic material had before the stretching operation.

One disadvantage of e.g. orientation-stretched polyester material is that owing to its crystalline structure the material cannot be heat-sealed. Consequently, the orientation-stretched polyester film cannot be used in connection with packages, where the high tensile strength of the material would be desirable, e.g. in packages for pressurized contents such as beer, refreshing beverages, etc.

A further disadvantage of polyester material is that it cannot readily be extruded through an annular die and then be blown up to a tube of a substantially greater diameter than that of the extruder die. The reason for this difficulty is the relatively low melt viscosity of the polyester material. At present, however, a modified polyester material with a higher melt viscosity (approx. 1.1) exists, which modified material has been found to be capable of being extruded and inflated to a tube of a diameter which is twice the size or greater than the diameter of the extruder die. At the instant of blow-up, however, the plastic material is so hot when it leaves the extruder that no molecular orientation takes place, but only a thinning out of the material occurs. For a molecular orientation to take place, the plastic material must be stabilized to a certain degree. For ordinary polyester the orientation temperature is between 70° and 95° C.

As mentioned earlier, the polyester material becomes crystalline when it is successfully oriented, which means that it cannot be heat-sealed. However, a cyclohexane-modified polyester material (PETG) is now on the market, which polyester material, depending on the degree of modification, remains largely amorphous even on stretching. This modified polyester material thus will not be molecular-oriented or will be molecular-oriented only in part on stretching, and therefore does not obtain the same tensile strength as the oriented polyester material. This modified material however has the advantage that it is heat-sealable. It has been found that the two polyester materials have very good mutual adhesion if they are extruded together.

The abovementioned difficulties and others in the manufacture of a biaxially oriented plastic material can be overcome by the method in accordance with the invention. In the present invention the plastic film is extruded through an annular die to form a seamless tube, which by means of a gas supplied to the inside of the tube, is inflated under a slight pressure. The diameter of the tube is at least doubled and at the same time the tube is drawn out at least to the same extent in its longitudinal direction. The tube thus formed is cooled, flattened and conducted between a pair of driven rolls, with the help of which a sealing of the tube is achieved. The flattened tube, possibly after an intermediary heating to orientation temperature, is blown up again with a gas so that the diameter is increased further at the same time as the inflated tube is stretched further in its longitudinal direction such that the tube material is biaxially molecular-oriented.

BRIEF DESCRIPTION OF THE DRAWINGS

In the following the invention will be described with reference to the enclosed schematic drawing, wherein like members bear like reference numerals and wherein FIG. 1 is a schematic view of an apparatus for the inflation and molecular orientation of the tube;

FIG. 1' is a schematic view of a portion of the apparatus of FIG. 1 illustrating a second embodiment of the present invention; and FIG. 2 is a cross-section of a laminated material in accordance with the invention.

DETAILED DESCRIPTION OF THE PREFERRED EMBODIMENTS

With reference to FIG. 1, a plastic tube 2 is extruded by means of an annular extruder die 1. The extruder die 1 may be of the ordinary type, when only one plastic material is extruded through the annular opening of the die, but it may also be a so-called "co-extrusion die" through which a number of plastic materials can be extruded together to form a laminate combination. Through a pipe 4 which ends at the central part of the extrusion die 1 a compressed gas, e.g. air, is introduced under a slight pressure, compared with atmospheric pressure (because of the low viscosity of the plastic material the pressure can be very small), into the plastic tube 2, so that the latter is expanded or blown up, the diameter of the tube 2 being increased to at least twice the size in relation to the diameter of the extrusion die 1, while at the same time the plastic material is stretched and thinned out. As can be seen from FIG. 1, the increase in diameter of the tube 2 takes place immediately after the plastic material has left the die 1. The plastic material is then in general so hot that no molecular orientation of the material is taking place. For example, if the plastic material consists of polyester the extrusion temperature (approx. 270° to 380° C.) lies substantially above the orientation temperature (70°–95° C.) so that the orientation in transverse direction of the tube in connection with the inflation will be negligible. The continuously extruded tube 2 is flattened and is introduced between a first pair of driven rolls 3. The feed speed of the rolls 3 is greater than the outlet speed of the plastic material from the extrusion die 1, so that the tube 2 will be stretched also in its longitudinal direction. The stretching in the longitudinal direction, which may be approximately of the same extent as the stretching in transverse direction, also takes place when the plastic material is so hot that no molecular orientation of the material is obtained. The extruded material is rapidly cooled and after passing through the driven rolls 3 the material in general has become fully stabilized, so that before or during a following second blowing operation it must in general be heated by special heating elements 5 so as to obtain the necessary orientation temperature. As the extruded tube is to be flattened between the pair of driven rolls 3, the tube 2 is guided towards the pair of rolls 3 by guiding plates 21 arranged to prevent folding of the plastic material. The plastic tube 9 flattened and stabilized by the pair of rolls 3 is now guided to a second pair of rolls 6. The second pair of rolls 6 is driven at the same speed as the pair of rolls 3 such that the tube is not subjected to any axial tension in the area 22 between the pairs of rolls 3 and 6.

In a following operation the extruded tube is to be inflated and stretched once more at such a temperature, that molecular orientation of the tube material can take place. For this second blow-up operation a compressed gas is required. Since the plastic material at the orientation temperature (75°-90° C.) is relatively stabilized, a relatively high pressure is required in the tube so that the required stretching and increase of diameter of the tube can be obtained (the required pressure depends on the tube diameter, the material thickness, the quality of the plastic, the temperature, etc.).

Since the tube 2 is seamless, a problem arises in supplying sufficient compressed gas to make orienting inflation possible. The problem is solved in accordance with the invention in that the tube 9 in the area 22 is filled with compressed gas, preferably air, by opening the pair of rolls 3 for a short period so that air from the supply pipe 4 and the tube 2 flows into the area 22 of the tube and fills out the tube portion 9. The filling out of the tube portion 9 can be facilitated and accelerated by providing plates 23 which are movable in relation to one another with suction elements, by which the tube portion 9 can be widened. When a sufficient quantity of gas (air) has been accummulated in the tube portion 9, the pair of rolls 3 is closed again, whereupon the accummulated gas is enclosed in the tube portion 9 between the pairs of rolls 3 and 6, in spite of the tube moving continuously between the pairs of rolls.

The tube 9 is flattened between the driven rolls 6 and is blown up again by a supply of the compressed gas, so that at least a further doubling of the diameter is obtained. To calibrate the diameter, rollers 8 fitted around the tube can be used. To achieve accurate orientation temperature, the tube portion 7 is heated with the help of the heating element 5, so that the plastic tube obtains molecular orientation in its transverse direction during the second inflation process. Since the driven rolls 10 move at a greater speed than the driven rolls 6 a longitudinal orientation of the tube is also achieved.

The compressed gas required for the orienting blowing operation is present in the space 24 between the pairs of rolls 6 and 10, but since the loss of a certain quantity of gas through the pair of rolls 10 is unavoidable, this compressed gas must be replenished in order that the pressure in the space 24 does not drop to such an extent that the inflation of the tube might not take place. The replenishing of compressed gas is achieved in that the pressure of the quantity of gas accummulated in the area 22 is increased with the help of specially arranged plates 23 which accommodate between them the tube 9 filled with gas. The tube 9 is compressed as the plates are moved together as a result of which the pressure in the tube portion increases. When the pressure has become somewhat higher than the pressure in the space 24, the pair of rollers 6 is separated and the accummulated and compressed gas in the tube portion 9 can flow into the space 24 wherein the pressure is raised again. The pair of rolls 6 is then closed and the continuous process of extrusion, inflation and orientation goes on. To prevent excessive friction between the plates 23 and the tube portion 9 containing the accummulated gas when the tube portion 9 moves continuously between the pairs of rolls 3 and 6, the plates 23 are preferably provided with a roller bed 25.

The tube 13 flattened after the second blowing stage has after passage through the driven pair of rolls 10 thus been given a biaxial orientation and after cooling the tube can be rolled up onto a roll 30 or be cut up to a web and be used. The plastic material, thanks to the biaxial orientation, has obtained a substantially improved tensile strength.

As mentioned earlier, the oriented material has a strong tendency to shrink on heating above the softening temperature of the plastics. However, this shrinkage can be prevented by a so-called hardening off of the material. The hardening off is carried out so that the longitudinal edges of the biaxial web formed are retained in retaining elements 11 and the plastic material, with the help of heating devices, is heated to a temperature exceeding the softening temperature of the plastic material. After a subsequent cooling process the plastic material has lost its capacity to shrink on heating, whilst the mechanical strength is substantially maintained. The material treated can now be rolled up on a magazine roll 14.

As indicated earlier, an orientation-stretched polyester material is in most cases scarcely suitable as a packing material, since it cannot be heat-sealed, which in turn is a consequence of having acquired a crystalline structure in the orientation-stretching process. The invention also provides a method for overcoming this disadvantage, and this is described in the following.

Instead of extruding only one plastic material through the extrusion die 1, two or more different plastic materials, e.g. polyester and the previously mentioned cyclohexane-modified polyester material (PETG), which to a large extent retains it amorphous molecular structure when it is subjected to a temperature where ordinary polyester material becomes molecular-oriented, are co-extruded. The two polyester materials achieve very good adhesion, in the co-extrusion, and since the PETG material does not become crystalline, this material retains its sealability. It is also conceivable to use in the co-extrusion in place of modified polyester material, polyethylene which, however, does not adhere as readily to the polyester material, so that in the co-extrusion a binder layer, e.g. so-called micro-wax which is marketed under the tradename ELVAX, or the plastic material which is marketed under the trade-name SURLYN, has to be added. In such a co-extrusion the binder layer may be made very thin so that after the stretching operation it has a surface area weight of only approx. 2-3 g/m$^2$.

In the case when a number of plastic materials are co-extruded at the same time through the extrusion die 1, the stretching process is carried out in the same manner as described above for a single layer of plastic material.

The supply of compressed air to the tube 7 during the second inflation phase may be realized in the manner as described before. It is also possible to separate the flattened tube at the rolls 10 into two webs 13, each of which is conducted in one direction and to arrange a nozzle 16 with sealing rollers 17 opening to a compressed gas line 15 (see FIG. 1'). When the pressure inside the tube 7 is too low and gas has to be added, the pressure in the line 15 increases so that the rollers 10 are separated a little and air flows into the tube 7, whereupon the gas supply is throttled as a sufficient pressure has been attained.

With reference to FIG. 2, a cross-section of the laminate in accordance with the invention consists of a layer of biaxially oriented plastic material 18, preferably polyester, and a second layer 19, which may consist of cyclohexane-modified polyester (PETG), which to some extent remains amorphous during stretching, or also of e.g. polyethylene in which case, however, a binder layer 20 of e.g. ELVAX or SURLYN or similar material has to be added.

It has been found that by the method in accordance with the invention a material of very high tensile strength can be obtained which moreover is heat-sealable. The material in accordance with the invention can be used advantageously in packaging of pressurized contents such as e.g. beer or refreshing beverages, where high tensile strength of the material is desirable.

For certain products, such as e.g. beer, the packing material in addition to high strength must also have barrier properties, i.e. it must be impermeable to gas, and in particular impermeable to oxygen and carbon dioxide. The polyester material in itself is relatively impermeable to gas, but because it can be made very thin and yet retain sufficient mechanical strength because of the orientation, the barrier properties will as a rule be unsatisfactory since these properties in general are in direct proportion to the thickness of the material. However, it has been found that it is possible to improve the barrier properties considerably if in the co-extrusion of the tube beside the plastic materials mentioned here, a material of extremely high impermeability to gases, e.g. polyvinyl-chloride or the material which is marketed under the tradename EVAL is also added. It is also possible to vacuum-metallize the orientation-stretched film or the laminate comprising orientation-stretched film by a very thin aluminium layer which has proved to have good gas barrier properties. This metallization is carried out in a known manner in that the film or the laminate is introduced into a vacuum chamber wherein the aluminium material is vaporized and condenses on the film so as to form an impermeable, but extremely thin, metal layer.

By using the method in accordance with the invention and the laminate which is manufactured by the method, it is thus possible to make use of the good mechanical properties of e.g. the polyester material, and as the material may be kept extremely thin it will also be cheap, with the added advantage that the magazine rolls, etc, of the packing material will be small and light which reduces transport expenses, etc.

The principles, preferred embodiment and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variation and changes which fall within in the spirit and scope of the present invention as defined in the appended claims be embraced thereby.

What is claimed is:

1. A method of manufacturing biaxially orientation-stretched plastic film, comprising the steps of extruding a plastic film through an annular die to form a seamless tube, simultaneously supplying a gas to the inside of the tube during forming to inflate the tube such that the diameter of the tube is at least doubled, simultaneously drawing out the tube at least to the same extent in its longitudinal direction, cooling the tube thus formed, flattening the tube, sealing the tube by conducting the tube between a first pair of driven rolls, expanding the tube formed in the first inflation operation after the flattening between the first pair of rolls by introducing gas, forming a gas reservoir or gas accumulator for continuously retaining a quantity of the introduced gas between the first and second pair of rolls, flattening the tube between the second pair of rolls, controlling the pressure of the gas in the gas reservoir by selectively moving two compression plates toward and away from one another which plates are arranged on either side of the gas reservoir, inflating the flattened tube again with the gas from the reservoir to increase the diameter to orientation stretch the tube, simultaneously further stretching the inflated tube in its longitudinal direction whereby the tube material is biaxially molecular-oriented, said pressure of the gas in the gas reservoir being controlled such that sufficient pressure is provided to ensure a proper subsequent inflation of the tube and to compensate for gas loss.

2. The method in accordance with claim 1, wherein the step of controlling the pressure of the gas further comprises the steps of opening and closing said first pair of rolls for supplying gas to the gas reservoir and opening and closing said second pair of rolls for withdrawing gas from the gas reservoir.

3. The method in accordance with claim 1, further comprising the steps of cutting the film which has been stretch-processed in three stages in a longitudinal direction of the tube, and spreading the film out to a plane web.

4. The method in accordance with claim 3, further comprising the steps of hardening off said web by heating the web to a temperature exceeding the softening temperature of the plastic material, and simultaneously retaining edge zones of the web at a fixed distance from each other to prevent shrinkage of the material.

5. The method in accordance with claim 1, wherein the plastic tube contains layers of polyester material.

6. The method in accordance with claim 1, wherein the plastic film comprises at least two layers of plastic material which are co-extruded.

7. The method in accordance with claim 1, wherein the plastic film comprises at least one layer of polyester and one layer of cyclohexane-modified polyester.

8. The method in accordance with claim 1, further comprising the step of heating the tube to orientation temperature prior to the orientation stretching.

* * * * *